(12) United States Patent  
Kimoto et al.

(10) Patent No.: US 10,370,770 B2  
(45) Date of Patent: Aug. 6, 2019

(54) PLATING SOLUTION FOR THREADED CONNECTION FOR PIPE OR TUBE AND PRODUCING METHOD OF THREADED CONNECTION FOR PIPE OR TUBE

(71) Applicants: NIPPON STEEL CORPORATION, Tokyo (JP); VALLOUREC OIL AND GAS FRANCE, Aulnoye-Aymeries (FR)

(72) Inventors: Masanari Kimoto, Kobe (JP); Kazuya Ishii, Nishinomiya (JP); Kunio Goto, Kobe (JP); Tatsuya Yamamoto, Wakayama (JP); Masahiro Oshima, Amagasaki (JP); Seiichiro Nakao, Akashi (JP); Daisuke Yamaguchi, Akashi (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 15/308,104

(22) PCT Filed: May 15, 2015

(86) PCT No.: PCT/JP2015/002456  
§ 371 (c)(1),  
(2) Date: Nov. 1, 2016

(87) PCT Pub. No.: WO2015/174095  
PCT Pub. Date: Nov. 19, 2015

(65) Prior Publication Data  
US 2017/0051421 A1    Feb. 23, 2017

(30) Foreign Application Priority Data

May 15, 2014    (JP) .................................. 2014-101795

(51) Int. Cl.
| | |
|---|---|
| *C25D 3/56* | (2006.01) |
| *C25D 3/58* | (2006.01) |
| *F16L 15/04* | (2006.01) |
| *C25D 7/00* | (2006.01) |
| *C25D 7/04* | (2006.01) |

(52) U.S. Cl.  
CPC ................. *C25D 3/58* (2013.01); *C25D 3/56* (2013.01); *C25D 7/003* (2013.01); *C25D 7/04* (2013.01); *F16L 15/04* (2013.01)

(58) Field of Classification Search  
CPC ............... C25D 3/56; C25D 3/58; C25D 3/60  
USPC ........................................ 205/241, 244, 253  
See application file for complete search history.

(56) References Cited

U.S. PATENT DOCUMENTS

| 4,389,286 A * | 6/1983 | McCoy ..................... C25D 3/58 |
| | | 205/239 |
| 2010/0059986 A1* | 3/2010 | Kimoto ................ C10M 111/04 |
| | | 285/55 |
| 2010/0300890 A1* | 12/2010 | Hartmann ................. C25D 3/60 |
| | | 205/252 |
| 2011/0174631 A1* | 7/2011 | Bronder .................... C25D 3/58 |
| | | 205/236 |

FOREIGN PATENT DOCUMENTS

| EP | 1 001 054 | 5/2000 |
| JP | 2003-074763 | 3/2003 |
| JP | 2008-215473 | 9/2008 |
| JP | 2010-270374 | 12/2010 |
| JP | 2011-527381 | 10/2011 |

OTHER PUBLICATIONS

Char, "Electrodeposition of Zinc," Electroplating (Bombay) [no month, 1959], vol. 1, No. 2, pp. 48-55. Abstract Only. (Year: 1959).*

* cited by examiner

*Primary Examiner* — Edna Wong  
(74) *Attorney, Agent, or Firm* — Clark & Brody

(57) ABSTRACT

Provided is a plating solution for a threaded connection used for forming a plating film excellent in galling resistance, crevice corrosion resistance, and exposure corrosion resistance. The plating solution contains no cyanide, but contains copper pyrophosphate, tin pyrophosphate, zinc pyrophosphate, pyrophosphate as a metal complexing agent, and a sulfur-containing compound of 40 g/L or less (excluding 0). The sulfur-containing compound includes: a mercapto compound and a sulfide compound defined by Chemical Formula (1); a dimer formed through a disulfide bond of the mercapto compounds; and one or more types of salts thereof:

$$RS-(CHX^1)_m-(CHX^2)_n-CHX^3X^4 \quad (1),$$

where each of m and n is an integer of 1 or 0; each of $X^1$, $X^2$, $X^3$ and $X^4$ is any one of hydrogen, OH, $NH_2$, $SO_3H$, and $CO_2H$, but excluding that $X^1$, $X^2$, $X^3$, and $X^4$ are all hydrogen; and R is any one of hydrogen, a methyl group, and an ethyl group.

2 Claims, No Drawings

PLATING SOLUTION FOR THREADED CONNECTION FOR PIPE OR TUBE AND PRODUCING METHOD OF THREADED CONNECTION FOR PIPE OR TUBE

TECHNICAL FIELD

The present invention relates to a plating solution, specifically, to a plating solution for a threaded connection for pipe or tube, and a producing method of a threaded connection for pipe or tube using the plating solution.

BACKGROUND ART

Pipes (so called Oil Country Tubular Goods (OCTG)) used for oil fields or natural gas fields have a unit length of ten or more meters. The pipes are connected to each other by the treaded connections, and the connected pipes (the connected oil country tubular goods) have an overall length as long as several thousand meters.

Threaded connections for pipes or tubes are classified into T&C (threaded and coupled) type threaded connections and integral type threaded connections.

A T&C type threaded connection includes two pins formed at each end of two pipes or two tubes, and two boxes formed at both ends of a coupling that is a short tube and has an outer diameter larger than the pipes or tubes. Each pin has an outer surface having male screws thereon. Each box has an inner surface having female screws thereon. Each pin is screwed into each box to be fastened thereto. Specifically, in a T&C type threaded connection, the pipes are connected to each other via the coupling.

Meanwhile, an integral type threaded connection includes a box formed at an end of a first pipe, and a pin formed at an end of a second pipe. The pin of the second pipe is screwed into the box of the first pipe, thereby connecting the first and the second pipes to each other. This means that in the integral type threaded connection, the first and the second pipes are directly connected to each other. A coupling is eliminated by using an integral type threaded connection. Hence, there is no outward extrusion by a thickness of the coupling, and thus there is no interfere with an inner surface of a pipe located outward. Accordingly, integral type threaded connections are used for a special usage such as horizontal excavations.

In general, threaded connections are required to have endurance against a tensile forth in the axial direction due to their own weights of the connected pipes as well as endurance against pressures of external and internal liquids.

Threaded connections are further required to have galling resistance. Specifically, a preferable galling resistance is required even after repetitive use four or more times in a casing pipe (large-diameter size), and ten or more times in a tubing pipe (small-diameter size). Conventionally, in order to enhance the galling resistance, copper plating films are formed, or surface treatments, such as phosphatizing, are applied on contact surfaces of pins or boxes of threaded connections. A contact surface denotes a surface portion where a pin and a box come into contact with each other, and such a contact surface includes a threaded portion that is threaded, and a non-threaded metal contact portion that is not threaded. A seal portion is equivalent to the non-threaded metal contact portion.

For the purpose of enhancing the galling resistance, prior to fastening, dope is applied on the contact surface of the pin or the box. The dope is a compound grease containing heavy metals, such as Pb.

However, heavy metals may affect the environment, and usage of dope containing heavy metals has been increasingly restricted. For this reason, dope (referred to as "green dope") free from heavy metals, such as Pb, Zn, and Cu, has recently been developed. However, green dope has a lower galling resistance than that of conventional dope.

As techniques to enhance the galling resistance without using dope, there have been proposed 1) a method of dispersingly mixing fluororesin particles in a plating film, 2) a method of forming a lubricating protective film through spattering, and 3) a method of using a solid lubricating film instead of using a compound grease, and other methods. However, each of these techniques provides a poorer galling resistance compared with that of conventional dope.

Japanese Patent Application Publication No. 2003-74763 (Patent Literature 1) and Japanese Patent Application Publication No. 2008-215473 (Patent Literature 2) propose threaded connections excellent in galling resistance. In Patent Literature 1, a Cu—Sn alloy layer is formed on a threaded portion and a non-threaded metal contact portion of a threaded connection. In addition, in Patent Literature 2, a Cu—Zn-M1 alloy layer (M1 is one or more types of elements selected from Sn, Bi, and In) is formed on a threaded portion and a non-threaded metal contact portion.

CITATION LIST

Patent Literature

Patent Literature 1: Japanese Patent Application Publication No. 2003-74763
Patent Literature 2: Japanese Patent Application Publication No. 2008-215473

However, in Patent Literature 1, corrosion (crevice corrosion) is likely to be caused at an interface (contact surface between a surface where a plating film is formed and a surface where no plating film is formed) between the pin and the box. Particularly, in the case of using green dope or a solid lubricant, crevice corrosion is more likely to be caused. In Patent Literature 2, crevice corrosion is suppressed. However, in the case of storing pipes in unconnected condition for long periods of time, spot rust may be generated through defects (porosity) of plating films depending on the environment. This means that exposure corrosion may be caused in some cases.

SUMMARY OF INVENTION

An object of the present invention is to provide a plating solution for a threaded connection for forming a plating film excellent in galling resistance, crevice corrosion resistance, and exposure corrosion resistance, and also to provide a producing method of a threaded connection using this plating solution.

A plating solution of the present embodiment is a plating solution for a threaded connection. The plating solution contains no cyanide, but contains copper pyrophosphate, tin pyrophosphate, zinc pyrophosphate, pyrophosphate as a metal complexing agent, and a sulfur-containing compound of 40 g/L or less (excluding 0). The sulfur-containing compound includes: a mercapto compound and a sulfide compound defined by Chemical Formula (1); a dimer formed through a disulfide bond of the mercapto compounds; and one or more types of salts thereof:

$$RS-(CHX^1)_m-(CHX^2)_n-CHX^3X^4 \qquad (1),$$

where each of m and n is an integer of 1 or 0; each of $X^1$, $X^2$, $X^3$ and $X^4$ is any one of hydrogen, OH, $NH_2$, $SO_3H$, and $CO_2H$, but excluding that $X^1$, $X^2$, $X^3$, and $X^4$ are all hydrogen; and R is any one of hydrogen, a methyl group, and an ethyl group.

A producing method of a threaded connection according to the present embodiment includes: a step of preparing the above described plating solution; and a step of subjecting a pin or a box of the threaded connection to electroplating using the plating solution so as to form a Cu—Sn—Zn alloy plating film on the pin or the box.

The threaded connection produced by using the plating solution of the present embodiment is excellent in galling resistance, crevice corrosion resistance, and exposure corrosion resistance.

DESCRIPTION OF EMBODIMENT

The present inventors have investigated mechanisms of generation of galling and corrosion in threaded connections, and have studied solutions therefor. As a result, the present inventors have attained the following findings.

In the case of repetitively fastening and loosening a threaded connection, contact sliding is caused between contact surfaces of a pin and a box of the connection. In such a case, the contact surfaces are heated due to deformation resistance. At this time, the contact surfaces may locally experience an increased temperature equal to or more than the melting point in some cases. In the surface portions having a temperature equal to or more than the melting point, the metals become melted and seized to each other.

In a threaded connection, if the contact surface portion has a higher melting point and a higher hardness, its deformation resistance becomes smaller. In such a case, an excellent galling resistance can be attained. If a plating film formed on the contact surface of the pin or the box is an intermetallic compound, the hardness and the melting point of the plating film becomes greater. Accordingly, it is possible to attain an excellent galling resistance.

Meanwhile, in the Cu—Sn alloy plating film of Patent Literature 1, crevice corrosion is considered to be caused for the following reasons. Fe is an electrochemically less noble metal than Cu. If the Cu—Sn alloy plating film is formed on the steel surface of the threaded connection, micro galvanic cells are formed between Cu in the plating film and the less noble steel (Fe) in contact with Cu. Hence, corrosion (crevice corrosion) is caused at an unplated portion (Fe) in contact with the plating film.

In order to suppress crevice corrosion, a metal less noble than Fe is contained in the Cu—Sn alloy. Specifically, Zn is contained in the Cu—Sn alloy to form a Cu—Sn—Zn alloy plating film. In this case, generation of crevice corrosion is suppressed.

Patent Literature 2 discloses a Cu—Sn—Zn alloy plating film. However, in Patent Literature 2, when forming the Cu—Sn—Zn alloy plating film, a plating solution formed of a water solution containing cyanide (referred to as a cyanide plating solution, hereinafter) is used.

In the cyanide plating solution, Cu is complexed with cyanide into a metal complex. By complexing Cu into a metal complex, it is possible to shift the deposition potential of Cu to less noble potential. Hence, during the electroplating treatment, while preventing Cu from being excessively electrodeposited alone, an appropriate amount of Cu is electrodeposited along (co-precipitated) with Zn whose deposition potential is less noble. Consequently, a Cu—Sn—Zn alloy plating film is formed.

However, in the case of forming a Cu—Sn—Zn alloy plating film using a plating solution including cyanide, spot rust may be caused on the Cu—Sn—Zn alloy plating film depending on the storage environment, the storage duration, and the others. Specifically, such a Cu—Sn—Zn alloy plating film does not have a high exposure corrosion resistance. Mechanisms of generating spot rust may be considered as follows. In the case of using cyanide, current efficiency becomes deteriorated during the electroplating. In the electroplating, hydrogen is generated along with the precipitation reaction of metals. During the electrolytic plating using cyanide, a large quantity of electricity is used for generating hydrogen. Consequently, fine void defects (porosity) are formed in the plating film due to generated hydrogen. If the porosity is combined, oxygen intrudes into the plating film from the outer surface of the plating film through the porosity, and reaches a steel material (Fe) under the plating film. In such a case, spot rust is caused.

The plating solution including cyanide generates a toxic hydrocyanic acid gas if being mixed with an acid solution. Generally, in the electroplating, an extremely thin film (such as a Ni plating film) is formed prior to forming of the plating film. This treatment is called as a strike plating. Formation of the thin plating film through the strike plating enhances adhesiveness of the plating film formed through the subsequent electroplating to the steel material. The plating solution is an acid solution.

In the case of a T&C type threaded connection, there are respectively provided a strike tank where a strike solution is reserved, a water tank for water cleaning, and a plating tank where a plating solution is reserved. A coupling for which a box is provided is soaked in the strike tank so as to be subjected to the strike plating. Subsequently, the box, after being subjected to the strike plating, is soaked in the water tank to be cleaned with the water. The acid strike solution is almost completely removed from the coupling through the water cleaning. Hence, no hydrocyanic acid gas is generated even if the cyanide is contained in the plating tank used in the subsequent electroplating.

Because a coupling of a T&C type threaded connection is a short pipe, the coupling can be soaked in each tank. To the contrary, in the case of an integral type threaded connection, it is hard to soak a pin or a box thereof in each tank. This is because an overall length of an integral type threaded connection is usually dozens of meters. Hence, in the case of forming a plating film on a pin or a box of an integral type threaded connection, the electroplating is carried out in a different manner from the above manner.

For example, the electroplating for an integral type threaded connection is carried out in the following manner. A sealable capsule is fixed to the pin or the box of the integral type threaded connection. The strike solution is supplied into the capsule so as to perform the strike plating. Subsequently, the strike solution is discharged from the capsule. After the discharge of the strike solution, the plating solution is supplied into the capsule and the electroplating is performed.

In the case of performing the electroplating in the above procedure, the remaining strike solution and the plating solution may be mixed in the capsule in some cases. In such a case, a hydrocyanic acid gas is likely to be generated. Accordingly, it is not preferable to use such a plating solution that contains cyanide.

The present inventors have studied a plating solution free from cyanide with which a Cu—Sn—Zn alloy plating film excellent in exposure corrosion resistance can be formed. As a result, the present inventors have attained the following findings.

It is possible to form a Cu—Sn—Zn alloy plating film without using cyanide if using a plating solution containing a pyrophosphate-based alkali aqueous solution and a sulfur-containing compound having a high reducibility.

In the case of carrying out the electroplating with the above plating solution, it is possible to suppress generation of hydrogen. Specifically, in the case of carrying out the electroplating with the plating solution containing cyanide, current efficiency is approximately 30%. In this case, approximately 70% of plating current is used for generating hydrogen. Meanwhile, in the case of carrying out the electroplating with the above plating solution containing the pyrophosphate and the highly reducible sulfur-containing compound, current efficiency is approximately 80%. Accordingly, there is less porosity in the Cu—Sn—Zn alloy plating film formed with this plating solution. As a result, it is possible to attain excellent exposure corrosion resistance while suppressing generation of spot rust. In addition, because of less porosity in the Cu—Sn—Zn alloy plating film, a higher hardness is attained. Hence, the galling resistance becomes enhanced.

The plating solution for a threaded connection accomplished based on the aforementioned findings contains no cyanide, but contains copper pyrophosphate, tin pyrophosphate, zinc pyrophosphate, pyrophosphate as a metal complexing agent, and a sulfur-containing compound of 40 g/L or less (excluding 0). The sulfur-containing compound includes: a mercapto compound and a sulfide compound defined by Chemical Formula (1); a dimer formed through a disulfide bond of the mercapto compounds; and one or more types of salts thereof:

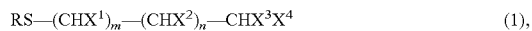

RS—(CHX$^1$)$_m$—(CHX$^2$)$_n$—CHX$^3$X$^4$     (1), where each of m and n is an integer of 1 or 0; each of X$^1$, X$^2$, X$^3$ and X$^4$ is any one of hydrogen, OH, NH$_2$, SO$_3$H, and CO$_2$H, but excluding that X$^1$, X$^2$, X$^3$, and X$^4$ are all hydrogen; and R is any one of hydrogen, a methyl group, and an ethyl group.

In the case of carrying out the electroplating using the plating solution of the present embodiment, generation of hydrogen is suppressed. Hence, it is possible to suppress amount of porosity in the Cu—Sn—Zn alloy plating film formed through the electroplating. Accordingly, generation of spot rust is suppressed, resulting in excellent exposure corrosion resistance. The Cu—Sn—Zn alloy plating film is also excellent in crevice corrosion resistance. Because of less amount of porosity in the Cu—Sn—Zn alloy plating film, the Cu—Sn—Zn alloy plating film has a higher hardness, and is excellent in galling resistance. In addition, although containing no cyanide, it is possible to form the Cu—Sn—Zn alloy plating film by using the plating solution of the present embodiment. Accordingly, there is no possibility of generation of a hydrocyanic acid gas in the plating treatment.

The producing method of the threaded connection according to the present embodiment includes a step of preparing the aforementioned plating solution, and a step of subjecting the pin or the box of the threaded connection to the electroplating using the above plating solution, thereby forming the Cu—Sn—Zn alloy plating film on the pin or the box.

The plating solution for the threaded connection and the producing method of the threaded connection using this plating solution according to the present embodiment will be described in detail, hereinafter.

[Plating Solution]

The plating solution of the present embodiment is used for electroplating on a pin or a box of a threaded connection. The plating solution contains no cyanide, but contains copper pyrophosphate, tin pyrophosphate, zinc pyrophosphate, a metal complexing agent, and an addition agent, and a solvent. In the present embodiment, the solvent of the plating solution is water.

[Copper Pyrophosphate, Tin Pyrophosphate, and Zinc Pyrophosphate]

Copper pyrophosphate, tin pyrophosphate, and zinc pyrophosphate are essential compounds for forming the Cu—Sn—Zn alloy plating film. The preferable lower limit of the copper pyrophosphate content in the plating solution is 1 g/L, and more preferably 3 g/L in terms of copper. The preferable upper limit of the copper pyrophosphate content is 50 g/L, and more preferably 15 g/L in terms of copper.

The preferable lower limit of the tin pyrophosphate content in the plating solution is 0.5 g/L, and more preferably 2 g/L in terms of tin. The preferable upper limit of the tin pyrophosphate content in the plating bath is 50 g/L in terms of tin, and more preferably 14 g/L.

The preferable lower limit of the zinc pyrophosphate content in the plating solution is 0.5 g/L, and more preferably 1 g/L in terms of zinc. The preferable upper limit of the zinc pyrophosphate content in the plating solution is 50 g/L in terms of zinc, and more preferably 20 g/L.

[Metal Complexing Agent]

In order to enhance operational advantage of the addition agent, the plating solution further contains pyrophosphate as the metal complexing agent. The pyrophosphate as the metal complexing agent may be sodium pyrophosphate, potassium pyrophosphate, ammonium pyrophosphate, or a mixture thereof, for example.

The preferable content of the pyrophosphate as the metal complexing agent in the plating solution is 6 to 15 in terms of the P ratio. The more preferable upper limit of the P ratio is 10, and the further more preferable upper limit thereof is 9. The P ratio is defined by the following Formula (A).

P ratio=mass of P$_2$O$_7$ in pyrophosphate as the metal complexing agent, and as metal salts of copper, tin, and zinc in the plating solution/mass of metals of copper, tin, and zinc in the plating solution     (A)

[Sulfur-Containing Compound]

The plating solution further contains a highly reducible sulfur-containing compound as an addition agent. The sulfur-containing compound includes: a mercapto compound and a sulfide compound each defined by Chemical Formula (1); a dimer formed through a disulfide bond of the mercapto compounds; and one or more types of salts thereof as defined by Chemical Formula (1):

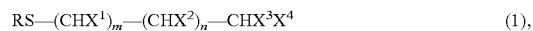

RS—(CHX$^1$)$_m$—(CHX$^2$)$_n$—CHX$^3$X$^4$     (1), where each of m and n is an integer of 1 or 0; each of X$^1$, X$^2$, X$^3$ and X$^4$ is any one of hydrogen, OH, NH$_2$, SO$_3$H, and CO$_2$H, but excluding that X$^1$, X$^2$, X$^3$, and X$^4$ are all hydrogen; and R is any one of hydrogen, a methyl group, and an ethyl group.

The sulfur-containing compound may be mercaptoacetic acid, 2-mercaptopropionic acid, 2-aminoethanethiol, 2-mercaptoethanol, 1-thioglycerol, mercaptopropane sulfonic acid, bis (3-sulfopropyl) disulfide, mercaptosuccinic acid, cysteine, cystine, or methionine, for example. The sulfur-containing compound may be a combination of these compounds.

The highly reducible sulfur-containing compound enables co-precipitation with Zn that is a less noble metal, suppresses generation of hydrogen during the electroplating, and also reduces amount of porosity in the plating film. If the content of the highly reducible sulfur-containing compound in the plating solution is excessively high, the Cu—Sn—Zn alloy plating film becomes hard to be formed, which may cause unplating. Accordingly, the preferable upper limit of the sulfur-containing compound in the plating solution is 40 g/L. The preferable lower limit of the sulfur-containing compound in the plating bath is 0.01 g/L.

[Surfactant]

The plating solution may further contain surfactant. The surfactant helps the hydrogen gas generated during the electroplating to be discharged to the outside from the surface of the steel material and the plating film. The preferable surfactant content in the plating bath is 0.0001 g/L to 10 g/L.

The plating solution of the present embodiment contains no cyanide. Although containing no cyanide, the aforementioned plating solution enables formation of the Cu—Sn—Zn alloy plating film through the electroplating.

[Producing Method of Threaded Connection]

The producing method of the threaded connection using the aforementioned plating solution is as follows. First, the above described plating solution is prepared. Subsequently, the electroplating using the above plating solution is carried out on the contact surface of the pin or the box of the threaded connection. The electroplating method is not limited to a specific one. If the threaded connection is of the T&C type, the electroplating may be carried out using the aforementioned plating tank. If the threaded connection is of the integral type, the electroplating may be carried out using the aforementioned capsule, or using other methods. The strike plating may be carried out prior to the electroplating. The threaded connection is produced through the aforementioned producing procedure. Conditions of the electroplating (bath temperature, pH of the plating solution, current density, etc.) are not limited to specific ones if the conditions are appropriately defined by a well-known method. A pretreatment, such as degreasing and pickling, may be performed prior to the electrolytic plating.

[Plating Film Formed on Threaded Connection]

The threaded connection produced by the aforementioned method includes the Cu—Sn—Zn alloy plating film formed on the pin or the box. The Cu—Sn—Zn alloy plating film contains Cu, Sn, and Zn, and a balance thereof is impurities. In the Cu—Sn—Zn alloy plating film, the preferable Cu content is 40 to 70 mass %, the preferable Sn content is 20 to 50 mass %, and the preferable Zn content is 2 to 20 mass %.

The preferable thickness of the Cu—Sn—Zn alloy plating film is 30 to 40 μm. As aforementioned, a Ni plating film may be formed under the Cu—Sn—Zn alloy plating film, or a Cu plating film may be formed instead of the Ni plating film.

Compared with a Cu—Sn—Zn alloy plating film produced by using a conventional plating solution containing cyanide, the Cu—Sn—Zn alloy plating film produced by the above described method has a less content of porosity. Hence, in the threaded connection including the Cu—Sn—Zn alloy plating film produced by the above producing method, spot rust is unlikely to be generated, and excellent exposure corrosion resistance can be attained. Because of a less content of porosity, the Cu—Sn—Zn alloy plating film has a higher hardness, and is excellent in galling resistance. In addition, the Cu—Sn—Zn alloy plating film is more excellent in crevice corrosion resistance compared with that of a Cu—Sn alloy plating film.

In the case of fastening threaded connections, each having a Cu—Sn—Zn alloy plating film thereon, to each other, a well-known lubricating film is formed on a contact surface of the pin or the box. The lubricating film may be a viscous liquid or semisolid lubricating film, or may be a solid lubricating film. The lubricating film may be a lubricating film having a two-layer structure including a solid lubricating film of a lower layer and a viscous liquid or semisolid lubricating film of an upper layer, or may be a lubricating film containing solid powder. The solid powder is not limited to specific one if the solid powder is a well-known substance exerting a lubricating effect. The solid powder may be graphite, $MoS_2$ (molybdenum disulfide), $WS_2$ (tungsten disulfide), BN (boron nitride), PTFE (polytetrafluoroethylene), CF (fluorocarbon), or $CaCO_3$ (calcium carbonate), etc.

The threaded connection produced by the producing method of the present embodiment exhibits an excellent galling resistance even if using the above lubricating film instead of using conventional dope containing heavy metals.

EXAMPLE

Plating films were formed on the threaded connections by using respective plating solutions of Test No. 1 to Test No. 8 as shown in Table 1. Examination was conducted on the obtained plating films for uniformity, galling resistance, crevice corrosion, and exposure corrosion of each plating film.

TABLE 1

| Test No. | Plating Solution | | | | | Plating Time Period (min.) |
|---|---|---|---|---|---|---|
| | Basic Composition | Addition Agent | Concentration (g/L) | Surfactant | Concentration (mL/L) | |
| 1 | Pyrophosphate (A-1) Solution | 2-aminoethanethiol | 5 | Amphoteric Surfactant | 5 | 3 |
| 2 | Pyrophosphate (A-1) Solution | 2-aminoethanethiol | 5 | Amphoteric Surfactant | 5 | 12 |
| 3 | Pyrophosphate (A-1) Solution | Mercaptoethanol | 15 | Amphoteric Surfactant | 5 | 3 |
| 4 | Pyrophosphate (A-1) Solution | None | — | Amphoteric Surfactant | 5 | 12 |
| 5 | Pyrophosphate | 2- | 45 | Amphoteric | 5 | 12 |

TABLE 1-continued

| | (A-1) Solution | aminoethanethiol | | Surfactant | | |
|---|---|---|---|---|---|---|
| 6 | Sulfate (C-1) Solution | Allylthiourea | 0.2 | Non-ionic Surfactant | 3 | 12 |
| 7 | Sulfate (E-1) Solution | None | — | None | — | 15 |
| 8 | Cyanate (F-1) Solution | None | — | None | — | 40 |

| | Plating Layer | | | Galling | | |
|---|---|---|---|---|---|---|
| Test No. | Chemical Composition | Thickness (μm) | Unplating Evaluation | Evaluation (M&B cycle) | Crevice Corrosion | Exposure Corrosion |
| 1 | Cu—Sn—Zn | 2 | E | 10 | E | E |
| 2 | Cu—Sn—Zn | 8 | E | 10 | E | E |
| 3 | Cu—Sn—Zn | 2 | E | 10 | E | E |
| 4 | Cu—Sn—Zn | 8 | NA | 3 | A | A |
| 5 | Cu—Sn—Zn | 8 | NA | 3 | A | A |
| 6 | Cu—Sn | 10 | E | 8 | NA | NA |
| 7 | Cu | 15 | E | 3 | A | A |
| 8 | Cu—Sn—Zn | 8 | E | 8 | G | NA |

First, plural seamless pipes were produced. Each chemical composition of the seamless pipes contained Cr of 13 mass %. Each seamless pipe had an outer diameter of 244.5 mm, a thickness of 13.84 mm, and a length of 1200 mm. In Test No. 1 to Test No. 7, a box was formed by internally threading an inner surface of one pipe end of each pipe, and a pin was formed by externally threading an outer surface of the other pipe end of each pipe, thereby forming an integral type threaded connection.

In Test No. 8, a coupling of a T&C type threaded connection was prepared. An inner surface at each end of the coupling was internally threaded into a box. The coupling had an outer diameter of 267.2 mm, a thickness of 24.0 mm, and a length of 335 mm.

[Preparation of Plating Solution]

The following four types of plating solutions were prepared.

(A-1) Solution:
Tin pyrophosphate: 10 g/L in terms of tin
Copper pyrophosphate: 10 g/L in terms of copper
Zinc pyrophosphate: 10 g/L in terms of zinc
Sodium pyrophosphate: 300 g/L
P ratio=7.7
(C-1) Solution:
Tin methanesulfonate: 15 g/L in terms of Sn
Copper methanesulfonate: 15 g/L in terms of Cu
Sulfuric acid: 180 g/L
(E-1) Solution:
Copper sulfate: 250 g/L
Sulfuric acid: 110 g/L
(F-1) Solution (Manufactured by Nihon Kagaku Sangyo Co., Ltd.):
Sn: 8.5 g/L
Cu: 23.0 g/L
Zn: 0.7 g/L
Sodium cyanide: 19.0 g/L
Caustic soda: 13.0 g/L The (A-1) solution had a composition within a range of the composition of the plating solution according to the present embodiment. The (C-1) solution and the (E-1) solution were sulphate baths mainly composed of sulphate. The (F-1) solution was a cyanide bath containing cyanide.

An addition agent and a surfactant were added to each solution as shown in Table 1. As the amphoteric surfactant, "Amphitol 24B", which is a brand name of Kao Corporation, was used in Test No. 1 and Test No. 2, and in Test No. 4 and Test No. 5. In Test No. 3, as the amphoteric surfactant, Softazoline LPB, which is a brand name of Kawaken Fine Chemicals Co., Ltd., was used. In test No. 6, as non-ion surfactant, polyoxyethylene dinonylphenyl ether was used. In each of Test No. 1 to Test No. 5 ((A-1) solution), the plating solution was obtained by further adjusting pH to be 8. In the adjustment of pH, polyphosphoric acid was used in Test No. 1 and Test No. 3 to Test No. 5, and orthophosphoric acid was used in Test No. 2.

[Electroplating]

In Test No. 1 to Test No. 7, the boxes of the respective integral type threaded connections were subjected to electroplating using the respective plating solutions as shown in Table 1. Specifically, the box of each threaded connection was covered with a sealable capsule. The inside of the capsule was filled with the corresponding plating solution, and the electroplating was carried out. The bath temperature was set to be 35° C. in each of Test No. 1 to Test No. 7. The respective plating time periods were as shown in Table 1.

In Test No. 8, the coupling of the T&C type threaded connection was subjected to the electroplating using the plating solution as shown in Table 1. Specifically, the coupling was soaked in the plating bath, and the electroplating was carried out. The bath temperature was 45° C. The plating time period was as shown in Table 1.

Each chemical composition of the obtained plating films was measured through EDX (energy dispersive X-ray analysis). Each chemical composition of the respective Cu—Sn—Zn alloy plating films in Test No. 1 to Test No. 5, and in Test No. 8 was such that Cu content: 55 mass %, Sn content: 35 mass %, and Zn content: 10 mass %. The chemical composition of the Cu—Sn alloy plating film in Test No. 6 was such that Cu content: 55 mass %, and Sn content: 45 mass %. The chemical composition of the Cu plating film in Test No. 7 was such that Cu content: 100 mass %.

[Unplating Determination Test]

On each plating film formed under the condition of each Test No., it was visually determined whether or not unplating portion (where the plating film was not locally formed, so that the surface of the steel material was exposed) was generated in the plating film. Specifically, the plating film in each Test No. was visually observed to confirm whether or not there was any "burnt deposit" therein. Determination results are shown in Table 1. "E" (Excellent) denotes that no burnt deposit was observed, and the plating film of interest was uniformly formed. "NA" (Not Acceptable) denotes that "burnt deposit" was observed in the plating film of interest.
[Galling Resistance Evaluation Test]

A lubricating coating was formed on the contact surface of each box on which the plating film was formed under the condition of each Test No. by the following method. As the lubrication agent, green dope, specifically Bestolife "3010"NM SPECIAL, which is a brand name of Bestolife Corporation, was used. Each thickness of the lubricating coating was 100 µm.

Fastening and loosening were repetitively performed using each box on which the plating film was formed under the condition of each Test No. and each pin which was not subjected to the plating treatment. This test was carried out at a normal temperature (25° C.). A torque used for the fastening and the loosening was 49351.8N·m (36400 ft·lbs). Every time one cycle of the fastening and the loosening was completed, each box was subjected to solvent cleaning to remove lubricating coating therefrom. The contact surface of each box with the lubricating coating removed therefrom was visually observed in a manner as to examine whether or not any galling was generated thereon. The fastening and the loosening were repetitively carried out up to ten times at maximum, and the number of cycles obtained by subtracting one from N cycles when the galling was observed for the first time (i.e., N-1 cycles; this number of cycles is referred as an M&B cycle, hereinafter) was used as an evaluation index of the galling resistance. If the M&B cycle was "10", this case means that no galling was observed even after 10 cycles of the fastening and the loosening. Test results are shown in Table 1.
[Crevice Corrosion Test]

A carbon steel plate material (equivalent to SPCC defined by JIS G3141 (2011)) was prepared. Plural test specimens were collected from the plate material. Each test specimen was subjected to the electroplating under the above described conditions using the plating solution of each Test No., thereby preparing a plated test specimen on whose surface the corresponding plating film as shown in Table 1 was formed.

Fixed test specimens were prepared in such a manner that, of the test specimens collected from the plate material, each of test specimens subjected to no electroplating (referred as a non-plated test specimen, hereinafter) and each plated test specimen in each Test No. were fixed in contact with each other with a bolt. A contact surface between each plated test specimen and each non-plated test specimen that were fixed to each other had a dimension of 50 mm×50 mm.

A crevice corrosion test was conducted using the fixed test specimens. Each fixed test specimen was soaked in a boiled water containing NaCl of 20 mass % for a month (31 days). Each of the fixed test specimens was taken out after a month, and a maximum corrosion depth in the contact surface of each non-plated test specimen in contact with the corresponding plated test specimen was measured.

Measurement results are shown in Table 1. "E" (Excellent) denotes that the maximum corrosion depth was less than 1 µm. "G" (Good) denotes that the maximum corrosion depth was 1 to less than 5 µm. "A" (Acceptable) denotes that the maximum corrosion depth was 5 to less than 10 µm. "NA" (Not Acceptable) denotes that the maximum corrosion depth was 10 µm or more.
[Exposure Corrosion Test]

Plated test specimens that were the same as those used in the above crevice corrosion test were prepared. In surfaces of each test specimen, a surface where the plating film was formed (referred to as an observation surface) had a dimension of 50 mm×50 mm. Each plated test specimen was subjected to a salt spray test in compliance with JIS Z2371 (2000) for 24 hours. In each observation surface after the test, an area where rust (spot rust) was generated was measured. Test results are shown in Table 1. "E" in Table 1 denotes that no rust was generated on the entire observation surface. "G" denotes the rust occurrence area ratio in the observation surface was less than 5%. "A" denotes that the rust occurrence area ratio in the observation surface was 5% to less than 20%. "NA" denotes that the rust occurrence area ratio in the observation surface was 20% or more.
[Test Results]

With reference to Table 1, in each of Test No. 1 to Test No. 3, the basic composition of the plating solution and the addition agent were both within the range of the present embodiment. Accordingly, the produced Cu—Sn—Zn alloy plating film exhibited no burnt deposit, and was produced uniformly. Each M&B cycle of these Test Nos. was ten cycles, which exhibited an excellent galling resistance. In each plating film of these Test Nos., excellent crevice corrosion resistance and excellent exposure corrosion resistance were obtained.

Meanwhile, the plating solution of Test No. 4 had an appropriate basic composition, but contained no sulfur-containing compound as the addition agent. Hence, burnt deposit was observed in the plating film. This is thought to be the proof of the generation of unplating portions therein. Consequently, the M&B cycle was as small as less than 4 cycles, so that the galling resistance was poor.

The plating solution of Test No. 5 had an appropriate basic composition, but had an excessively high content of the sulfur-containing compound as the addition agent. Hence, burnt deposit was observed in the plating film. This is thought to be the proof of the generation of unplating portions therein. Consequently, the M&B cycle was as small as less than 4 cycles, so that the galling resistance was poor.

The film formed using the plating solution of Test No. 6 was a Cu—Sn alloy plating film. Hence, the crevice corrosion resistance and the exposure corrosion resistance were poor.

The film formed using the plating solution of Test No. 7 was a Cu plating film. Hence, the M&B cycle was as small as less than 4 cycles, so that the galling resistance was poor.

In the plating solution of Test No. 8, a plating solution containing cyanide was used. In this case, a uniform Cu—Sn—Zn alloy plating film was formed. However, the Cu—Sn—Zn alloy plating film formed using this plating solution exhibited a poor exposure corrosion resistance. It can be considered that the plating solution contained cyanide, and thus plenty of hydrogen was generated during the electroplating, which resulted in a large amount of porosity in the plating film.

The embodiment of the present invention has been described as above; however, the aforementioned embodiment is merely an example for carrying out the present invention. Accordingly, the present invention is not limited to the aforementioned embodiment, and the aforementioned embodiment may be appropriately modified without departing from the scope of the present invention.

The invention claimed is:

1. A plating solution for a threaded connection for pipe or tube, the plating solution containing no cyanide,
the plating solution further containing:
copper pyrophosphate;
tin pyrophosphate;
zinc pyrophosphate;
pyrophosphate as a metal complexing agent; and one or more sulfur-containing compounds of 0.01 to 40 g/L selected from the group consisting of a mercapto compound defined by Chemical Formula (1), a sulfide compound defined by the Chemical Formula (1), and a salt thereof:

wherein the Chemical Formula (1) is defined by $RS-(CHX^1)_m-(CHX^2)_n-CHX^3X^4$, where each of m and n is an integer of 1 or 0; each of $X^1$, $X^2$, $X^3$ and $X^4$ is any one of hydrogen, OH, and $NH_2$, but excluding that $X^1$, $X^2$, $X^3$, and $X^4$ are all hydrogen; and R is any one of hydrogen, a methyl group, and an ethyl group.

2. A producing method of a threaded connection for pipe or tube comprising:

a step of preparing the plating solution according to claim 1; and a step of subjecting a pin or a box of the threaded connection to electroplating using the plating solution so as to form a Cu—Sn—Zn alloy plating film on the pin or the box.

* * * * *